UNITED STATES PATENT OFFICE.

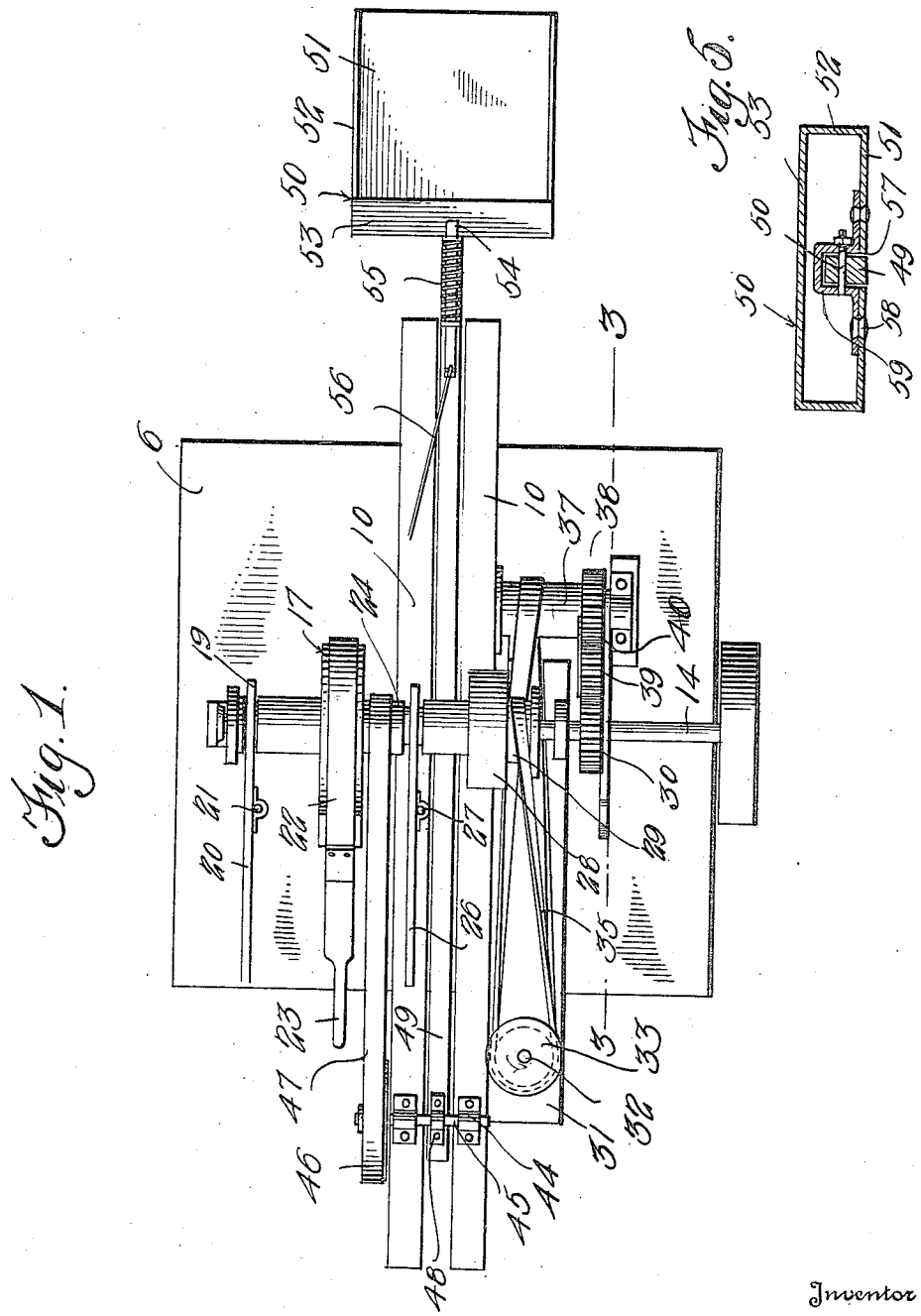

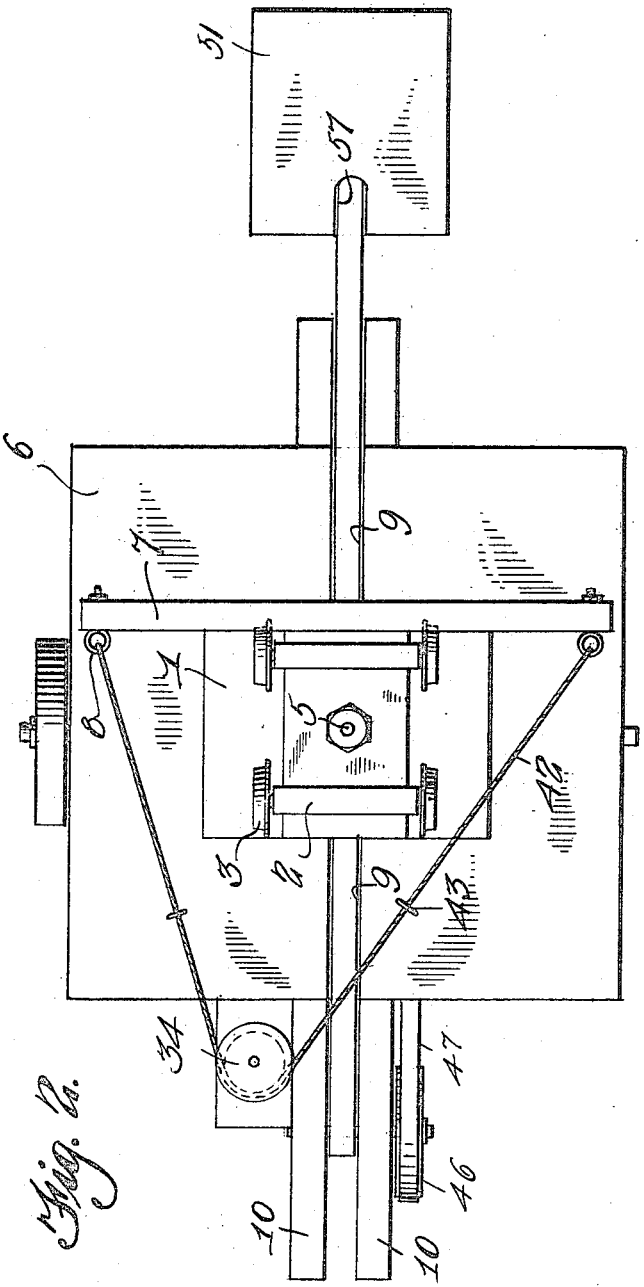

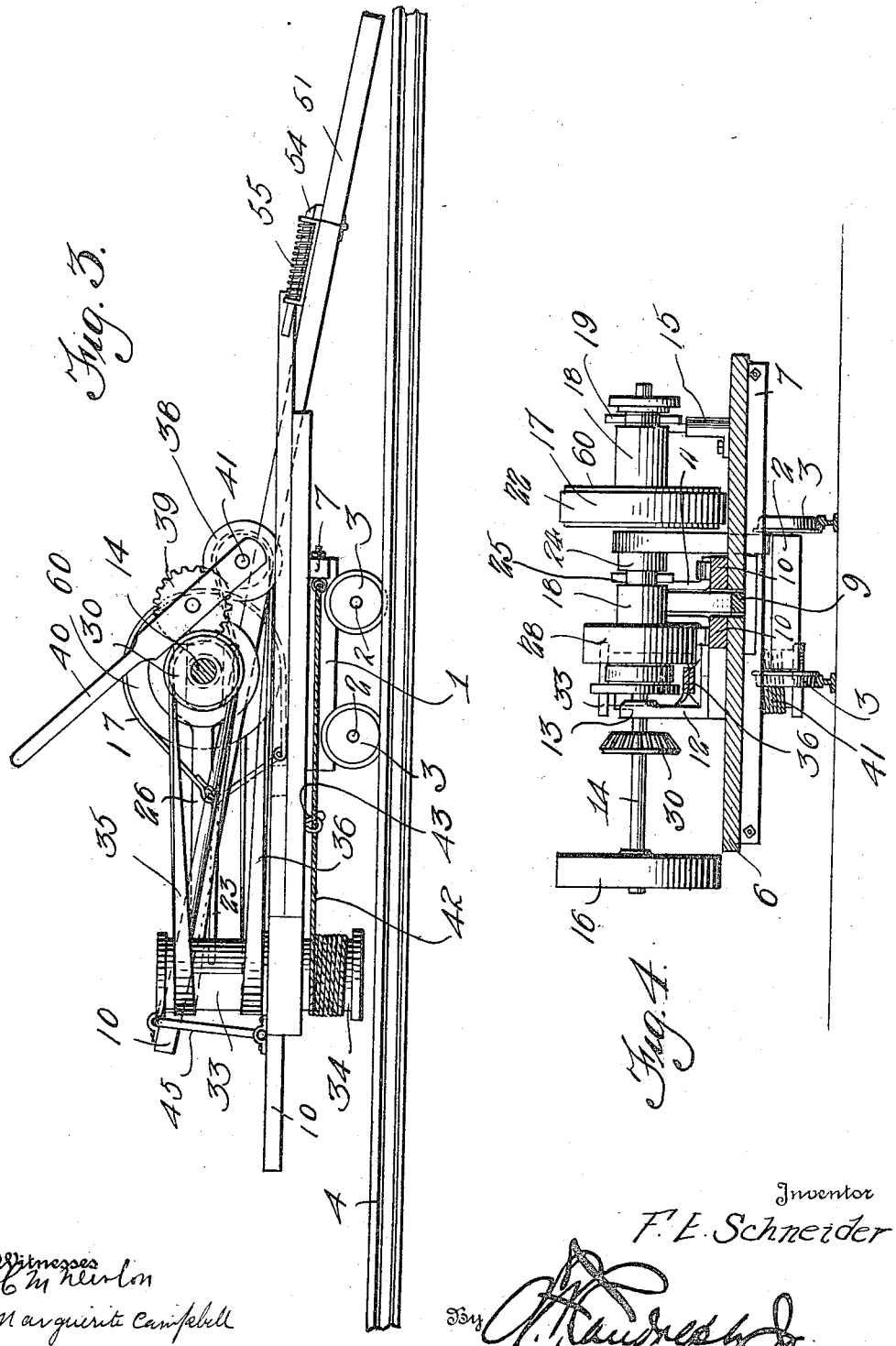

FREDERICK E. SCHNEIDER, OF HIGHLAND, WISCONSIN, ASSIGNOR OF ONE-FOURTH TO EDWARD P. CODY AND ONE-FOURTH TO JAMES P. SHEA, BOTH OF HIGHLAND, WISCONSIN.

SHOVEL.

1,265,528.    Specification of Letters Patent.    Patented May 7, 1918.

Application filed May 2, 1917. Serial No. 165,934.

*To all whom it may concern:*

Be it known that I, FREDERICK E. SCHNEIDER, a citizen of the United States, residing at Highland, in the county of Iowa and State of Wisconsin, have invented certain new and useful Improvements in Shovels; and I do hereby declare the following to be a full, clear, and exact description of the invention, such as will enable others skilled in the art to which it appertains to make and use the same.

This invention relates to new and useful improvements in shovels, and the principal object of the invention is to provide an excavating shovel which is adapted to be mounted on a truck and is arranged to be swung laterally on said truck to enable the same to be readily positioned for operation.

Another object of the invention is to provide a shovel which is designed particularly to use electric power for the driving means. It will be understood however that any other desired power may be used without departing from the spirit and scope of the invention.

Still another object of the invention is to provide a shovel having a novel operating means.

A further and more specific object of the invention is to provide a novel means for controlling the lateral swinging movement of the shovel on the truck.

A still further object of the invention resides in the provision of a novel clutch by which the various operations of the device are controlled.

As a further object the invention contemplates the provision of a novel actuating means for the shovel which is designed to reduce the friction to a minimum and avoid many of the difficulties ordinarily accompanying the use in steam shovels.

With these and other objects in view the invention consists in the novel combination and arrangement of parts which will be fully set forth in the following specification and accompanying drawings, in which:—

Figure 1 is a top plan view of a shovel constructed in accordance with this invention.

Fig. 2 is a bottom plan view of Fig. 1.

Fig. 3 is a side view in elevation of the device.

Fig. 4 is a transverse sectional view through the device, and

Fig. 5 is a transverse sectional view through the shovel illustrating in detail the connection of the shovel to the shovel arm.

Referring to the drawings the numeral 1 designates a car or truck which is provided with the usual axle 2 and the flange wheels 3 for running on a track 4. This truck is provided with a central aperture for the reception of a pivot bolt 5 which rotatably supports the platform 6 on which the machinery is mounted. A transversely extending arm 7 is attached to the forward end of the truck 1 and is provided at opposite ends with eyes 8 which form attaching means for the flexible member by means of which the platform 6 is turned. The platform 6 is provided at is forward and rear edges with longitudinally extending slots 9 which extend to a point in a plane with the forward and rear edges of the truck 1 and secured to the platform on the upper side are the longitudinally extending strips 10 which are arranged so that their adjacent edges are flush with the adjacent edges of the slot 9 hereinbefore referred to. The strips 10 project beyond the forward and rear ends of the platform and form guides for the shovel arm which will be more fully hereinafter described. Secured to one of the strips and centrally thereof is a pedestal 11, while a similar pedestal 12 extends upwardly from the platform 6 and on the upper end of these pedestals are formed bearings 13 in which the main shaft 14 is rotatably mounted. A similar pedestal 15 is arranged at the outer edge of the platform 6 as clearly illustrated in Fig. 4. A main drive wheel 16 is attached to the shaft 14 on the end opposite that which is journaled in the pedestal 15 and to this wheel is connected the driving motor by means of which the device is operated. Slidably mounted on the shaft 14 is a wheel 17 adjacent which is the sleeve 18 of a clutch member. This sleeve is provided with an annular groove to receive the part 19 of a suitable shifting lever 20 which is pivotally mounted as at 21 on the platform 6. The friction band 22 surrounds the wheel 17 and is provided with a lever 23 by means of which it may be contracted on the periphery of the wheel 17 in order to stop the rotation thereof. A pulley 24 is formed on the hub of the wheel 17 and is arranged to the drive pulley of the shovel arm which will be more fully hereinafter described. Slidably mounted on the shaft 14 adjacent the bearing 11 is a clutch sleeve 18 which is grooved to receive the fork 25 of a clutch lever 26 which is pivoted as at 27 to the platform 6. The clutch sleeve 18 controls the movements of the clutch within the wheel 28 which is formed with a pulley 29 over which one of the drive belts for moving the platform on the truck runs. Mounted on the shaft 14 beside the pedestal 12 is a beveled pinion 30 which drives the pulley for rotating the platform in the opposite direction.

An extension 31 is formed on the platform and is provided with a vertical aperture through which a shaft 32 is rotatable. This shaft is provided at its upper end with a pulley 33 and at its lower end with a drum 34. The pulley 33 and drum 34 are respectively positioned above and below the platform. The belt 35 surrounds the pulley 33 and passes over the pulley 29 while a similar belt 36 surrounds the pulley 33 and passes over the pulley 37 mounted on the platform at a point forwardly of the shaft 14. A beveled pinion 38 is carried on one end of the pulley 37 and meshes with a beveled pinion 39 carried on a lever 40 which is pivotally mounted on the shaft 41 of the pulley 37. This beveled pinion 39 is adapted to mesh not only with the beveled pinion 38 but with the pinion 30 hereinbefore described when the lever 40 is in the position illustrated in Figs. 1 and 3. It will be understood however that when the lever is thrown over in the direction of the arrow in Fig. 3, the pinion 39 will be moved out of engagement with the pinion 30 thereby discontinuing the rotation of the pulley 37. The drum 34 has wound therearound a flexible member 42 the ends of which are passed through eyes 43 and connected to the eyes 8 of the beam 7. It will thus be seen that when the drum is rotated in either direction, the platform will be swung relative to the truck.

Journal bearings 44 are attached to the upper sides of the strips 10 near their rear ends and journaled in said bearings is a crank shaft 45 carrying at its outer ends a pulley 46 over which the belt 47 which passes over the pulley 24 runs. The bight portion of the crank shaft is received in a bearing 48 carried on the shovel arm 49 which is slidably mounted between the strips 10 and carries at its forward end a shovel designated generally by the numeral 50. The shovel above referred to comprises a bottom 51 having formed thereon side walls 52 which are connected adjacent their rear ends by a top wall 53. A latch 54 which is surrounded by a compressed coil spring 55 is slidably mounted on the upper side of the forward end of the beam 49 and normally engages the plate 53 in order to hold the forward end of the shovel in raised position. When it is desired to release the shovel, pull is exerted on the flexible member 56 which is attached to the rear end of the latch 54 and it will be seen that the latch will be drawn rearwardly against the depression of the spring 55 and thereby the shovel will be released. The rear end of the bottom of the shovel is slotted as at 57 and riveted or otherwise secured as at 58 to the inner side of the bottom of the shovel adjacent its rear end is a yoke 59 which is apertured to receive the pivot bolt by means of which the forward end of the arm 49 is pivotally connected to said shovel.

It will be apparent from the foregoing that in use the shovel is set in operation by driving the wheel 16 which rotates the shaft 14 and when the clutch lever 20 is operated, it will be evident that the pulley 46 will be driven thereby causing the crank shaft 45 to revolve and move the double arm 49. Assuming that the wheel 16 moves in a clockwise direction, it will be seen that the forward movement of the shovel will also give downward movement to the same, and if the shovel is hanging loosely with its forward end down, it will be seen that the same will have a digging action so that as it completes the stroke, the forward end will tend to lift upwardly and such movement will cause the latch to engage and hold the forward end of the shovel upwardly. After the stroke of the shovel the clutch is released and the brake 22 applied, thereby holding the shovel in a desired position, after which the user may swing the platform to either side by a manipulation of either the lever 26 or the lever 40 and after the shovel has been positioned properly, the flexible member 56 is pulled, thereby releasing the latch 54 and allowing the forward end of the shovel to fall and drop the contents. It is apparent that the shovel is then ready for a second operation and the platform is returned to original position whereupon the lever is manipulated to cause the shovel to move forwardly and downwardly as previously described.

While in the foregoing there has been shown and described the preferred embodiment of this invention, it is to be understood that such changes may be made in the combination and arrangement of parts as will fall within the spirit and scope of the invention as claimed.

What is claimed is:

1. In a shovel, a truck, a platform swivelly mounted on said truck, a drive shaft mounted on the platform and extending transversely thereof, guides extending longitudinally of the platform, a crank shaft mounted on the guides in parallel relation to the drive shaft, a shovel arm slidable through the guides, a shovel at the forward end of the shovel arm, and means controlling the movements of the shovel arm.

2. In a shovel, a truck a platform swivelly mounted on said truck, a drive shaft extending transversely of the platform, guides extending longitudinally of the platform, a shovel arm slidable between the guides, the guides projecting beyond the forward and rear ends of the platform, a crank shaft mounted near the rear ends of the guides and connected to the shovel arm, and means for connecting the crank shaft with the drive shaft whereby the operation of the shovel may be controlled.

3. In a shovel, a truck, a platform swivelly mounted on said truck, a drive shaft mounted on the platform and extending transversely thereof, guides extending longitudinally of the platform, a crank shaft mounted on the guides in parallel relation to the drive shaft, a shovel arm slidable through the guides, a shovel at the forward end of the shovel arm, means controlling the movements of the shovel arm, and means to turn the platform on the truck.

In testimony whereof I affix my signature in presence of two witnesses.

FREDERICK E. SCHNEIDER.

Witnesses:
 REGINA C. DOYLE,
 FRED WEIDENFELLER.

Copies of this patent may be obtained for five cents each, by addressing the "Commissioner of Patents, Washington, D. C."